United States Patent
Bhatia et al.

(10) Patent No.: US 11,636,036 B2
(45) Date of Patent: *Apr. 25, 2023

(54) UNIFIED MEMORY MANAGEMENT FOR A MULTIPLE PROCESSOR SYSTEM

(71) Applicant: Hughes Network Systems, LLC, Germantown, MD (US)

(72) Inventors: Gaurav Bhatia, Elkridge, MD (US); Daniel C. Hantz, Montgomery Village, MD (US); Ashish A. Varhale, Germantown, MD (US); Karan Kakkar, Germantown, MD (US); Yingquan Cheng, Clarksburg, MD (US); Yogesh Sethi, Boyds, MD (US)

(73) Assignee: Hughes Network Systems, LLC, Germantown, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 17/587,102

(22) Filed: Jan. 28, 2022

(65) Prior Publication Data

US 2022/0222179 A1 Jul. 14, 2022

Related U.S. Application Data

(63) Continuation of application No. 17/031,432, filed on Sep. 24, 2020, now Pat. No. 11,281,583.

(51) Int. Cl.
*G06F 12/00* (2006.01)
*G06F 12/0815* (2016.01)
(Continued)

(52) U.S. Cl.
CPC ...... *G06F 12/0815* (2013.01); *G06F 9/30087* (2013.01); *G06F 9/467* (2013.01);
(Continued)

(58) Field of Classification Search
CPC .............. G06F 12/0815; G06F 9/0087; G06F 12/0811; G06F 12/087; G06F 12/1045
See application file for complete search history.

(56) References Cited

U.S. PATENT DOCUMENTS

2004/0260889 A1 12/2004 Cypher
2018/0300931 A1 10/2018 Vembu et al.
(Continued)

FOREIGN PATENT DOCUMENTS

KR 20200108773 A 9/2020

OTHER PUBLICATIONS

International Search Report and Written Opinion for PCT/US2021/051669 dated Dec. 3, 2022, all pages.
(Continued)

*Primary Examiner* — Arvind Talukdar
(74) *Attorney, Agent, or Firm* — Kilpatrick Townsend & Stockton, LLP

(57) ABSTRACT

Various multi-processor unified memory management systems and methods are detailed herein. In embodiments detailed herein, inter-chip memory management modules may be executed by processors that are in communication via an inter-chip link. A flat memory map may be used across the multiple processors of the system. Each inter-chip memory management module may analyze memory transactions. If the memory transaction is directed to a portion of the flat memory map managed by another processor, the memory-transaction may be translated to a non-memory mapped transaction and transmitted via an inter-chip communication link.

20 Claims, 4 Drawing Sheets

(51) Int. Cl.
*G06F 9/30* (2018.01)
*G06F 9/46* (2006.01)
*G06F 12/0811* (2016.01)
*G06F 12/0873* (2016.01)
*G06F 12/1045* (2016.01)

(52) U.S. Cl.
CPC ...... *G06F 12/0811* (2013.01); *G06F 12/0873* (2013.01); *G06F 12/1045* (2013.01)

(56) References Cited

U.S. PATENT DOCUMENTS

| | | |
|---|---|---|
| 2019/0018813 A1 | 1/2019 | Das Sharma |
| 2019/0042489 A1 | 2/2019 | Nagabhushana et al. |
| 2019/0121737 A1 | 4/2019 | Lee et al. |

OTHER PUBLICATIONS

Xilinx: "AXI DMA v7.1 LogiCORE IP Product Guide Vivado Design Suite Chapter 2: Product Specification Chapter 3: Designing with the Core", Jun. 14, 2019 (Jun. 14, 2019), XP055764730, Retrieved from Internet: URL: https://www.xilinx.com/support/documentation/ip_documentation/axi_dma/v?_1/pg021_axi_dma.pdf p. 57.

Yvo Thomas Bernard Mulder: "Feeding High-Bandwidth Streaming-Based FPGA Accelerators", Thesis, Jan. 1, 2018 (Jan. 1, 2018), pp. 3-131, XP055712674, Retrieved from the Internet: URL: https://www.researchgate.net/publication/326541074_Feeding_High-bandwidth_Streaming-Based_FPGA_Accelerators [retrieved on Jul. 8, 2020] p. 54.

UNIFIED MEMORY MANAGEMENT FOR A MULTIPLE PROCESSOR SYSTEM

CROSS-REFERENCES TO RELATED APPLICATIONS

This application is a continuation of U.S. patent application Ser. No. 17/031,432, filed on Sep. 24, 2020, entitled "Unified Memory Management For A Multiple Processor System," the disclosure of which is hereby incorporated by reference in its for all purposes.

BACKGROUND

Processing systems can use different types of transactions to move data. A first processing system may use memory-mapped transactions to move data to a specific memory address of a recipient processing system. A second processing system may use a stream transaction to send data to a recipient processing system that is then tasked of determining how to handle the received data. Using different forms of transactions within a system can be inefficient and can complicate memory management.

SUMMARY

Various embodiments are described related to a multi-processor unified memory management system. In some embodiments, a multi-processor unified memory management system is described. The system may comprise a first programmable processor system that may communicate via an inter-chip link with a second programmable processor system. The first programmable processor system may comprise a first inter-chip memory management module that may be configured to analyze memory access transactions. The first inter-chip memory management module may be configured to translate outbound memory-mapped transactions into non-memory mapped transactions comprising coded memory address data. The first inter-chip memory management module may be configured to translate inbound non-memory mapped transactions into memory-mapped transactions based on coded memory address data. The system may comprise the second programmable processor system that may communicate via the inter-chip link with the first programmable processor system. The second programmable processor system may comprise a second inter-chip memory management module configured to analyze memory access transactions. The module may be configured to translate outbound memory-mapped transactions into non-memory mapped transactions comprising coded memory address data. The module may be configured to translate inbound non-memory mapped transactions into memory-mapped transactions based on coded memory address data.

Embodiments of such a system may include one or more of the following features: the first inter-chip memory management module may be further configured to analyze a memory access transaction. The module may be further configured to determine that the memory access transaction may involve a memory address accessible via the second programmable processor system. The module may be further configured to, in response to determining that the memory access transaction involves the memory address accessible via the second programmable processor, output a non-memory mapped transaction via an inter-chip high speed link to the second programmable processor. The non-memory mapped transaction may comprise coded memory address data. The second inter-chip memory management module may be further configured to receive the non-memory mapped transaction from the first inter-chip memory management module. The second inter-chip memory management module may be further configured to store data from the received non-memory mapped transaction into a memory, such as random access memory (RAM) or a local buffer, at a memory location based on the coded memory address data included in the non-memory mapped transaction. The system may further comprise a first random access memory (RAM) or local buffer directly accessible by only the first programmable processor system. The system may further comprise a second RAM or local buffer directly accessible by only the second programmable processor. The first inter-chip memory management module and the second inter-chip memory management module may use a common flat memory map. The first programmable processor system may comprise a first field programmable gate array (FPGA). The second programmable processor system may comprise a second FPGA. The second programmable processor system may comprises a reduced instruction set computer (RISC) processor. The system may further comprise an inter-chip link between the first programmable processor system and the second programmable processor system.

In some embodiments, a method for using a unified memory management system is described. The method may comprise outputting, by a native processing module of a first processor, a memory transaction. The method may comprise determining, by a first inter-chip memory management module executed by the first processor, that the memory transaction may correspond to a portion of a flat memory map that is managed by another processor. The method may comprise translating, by the first inter-chip memory management module, the memory transaction into a non-memory mapped memory transaction. The method may comprise transmitting, by the first inter-chip memory management module, the translated memory transaction via an inter-chip link to a second inter-chip memory management module of a second processor. The method may comprise translating, by the second inter-chip memory management module, the translated memory transaction into a memory-mapped memory transaction. The method may comprise performing, by the second inter-chip memory management module, the memory-mapped memory transaction.

Embodiments of such a method may include one or more of the following features: the non-memory mapped memory transaction may be a stream-based memory transaction. The method may further comprise receiving, by the second inter-chip memory management module, the transmitted translated memory transaction via the inter-chip link. The method may further comprise determining, by the second inter-chip memory management module, that the transmitted translated memory transaction may not to be forwarded. Determining that the transmitted translated memory transaction may not to be forwarded may be based on the portion of the flat memory map being managed by the second inter-chip memory management module of the second processor. The first processor may be a first field-programmable gate array (FPGA) and the second processor may be a second FPGA. Performing the memory-mapped memory transaction may comprise storing data from the memory transaction into random access memory (RAM) at a memory location based on coded memory address data included in the non-memory mapped transaction. A memory address corresponding to the flat memory map may be transmitted via a side-band communication as part of transmitting the translated memory transaction via the inter-chip link. Transmitting, by the first inter-chip memory management module, the translated memory transaction via the inter-chip link to the second inter-chip memory management module of the second processor may comprise forwarding, by a third inter-chip memory management module of a third processor, the translated memory transaction via the inter-chip link to the second inter-chip memory management module of the second processor. The first processor may be connected with the second processor only via the third processor.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
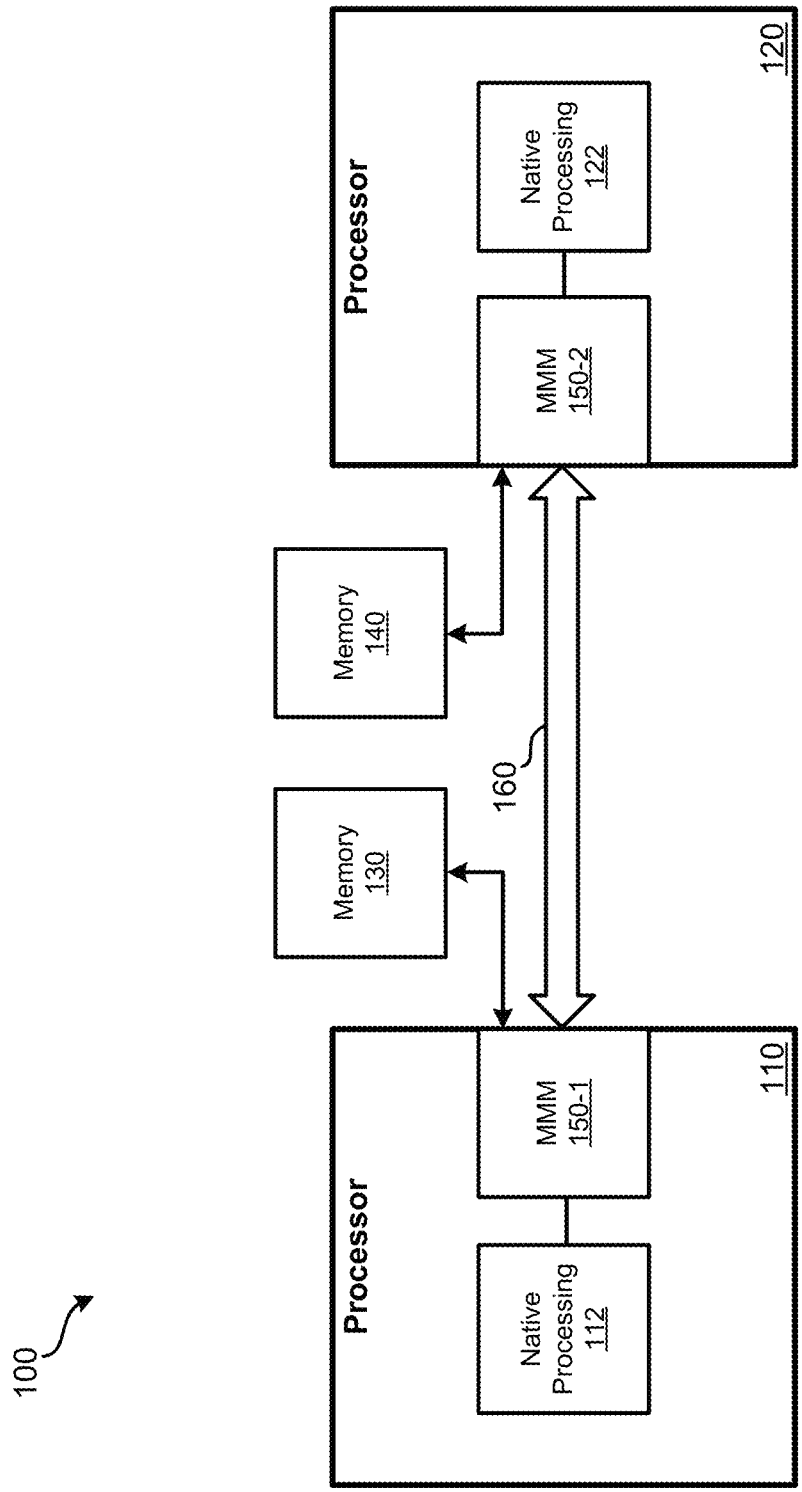
FIG. 1 illustrates an embodiment of a multi-processor unified memory management system.

Embodiments detailed herein disclose the use of a memory management module (MMM) that can allow for a flat memory map to be used across a multiple processor system. The MMM can have the ability to handle both memory map and stream inter-chip transactions. Communication between processors may be performed using stream-based transactions across a high speed interface.

When a memory transaction is to be performed by a programmable processor, such as a field programmable gate array (FPGA), the memory transaction may be routed to an MMM implemented as part of the processor. The MMM may have stored a flat memory map that defines how memory is assigned across multiple processors, including the first processor on which the MMM is implemented. MMMs on the other processors in communication with the first processor can store the same memory map. Based on the received memory transaction, the MMM may determine whether a locally-accessible memory (e.g., random access memory, RAM, local buffer) is to be accessed or if a memory accessible via another processor is to be accessed. If the memory transaction involves the locally-accessible memory, the MMM may perform a memory-mapped transaction directly with the locally-accessible memory. If the memory transaction involves a memory of another processor, the processor may determine the appropriate processor to transmit the memory transaction to and may translate the memory transaction into a stream-based memory transaction. This stream-based memory transaction can include coded memory address data. The stream-based memory transaction may then be sent via a high speed inter-chip link to the appropriate processor. An MMM of the processor that receives the stream-based memory transaction may decode the coded memory address data and store to the appropriate locally-accessible memory. While stream-based memory transactions are typically used for data processing-related memory transactions, all inter-chip memory transactions between MMMs of processors may be handled using stream-based memory transactions.

Such an arrangement can have one or more distinct advantages. For a multiple processor system, a single simple memory map can be implemented that is common across all processors. Each processor can be configured to access and use the entire memory, even though various portions of the memory are only directly accessible via a particular IC. The MMM of each processor can handle routing of memory transactions to the appropriate processor and can handle both memory-mapped and stream based memory transactions. Therefore, when inter-chip communication is necessary for a memory transaction, the MMMs handle conversion, if needed, of the memory transaction into a stream-based transaction that includes encoded memory address data and decoding of the stream-based transaction upon receipt.

Additionally or alternatively, such an arrangement that uses MMMs can allow for priority-based routing among various memory mapped and non-memory-mapped transactions. Such an arrangement can allow for a particular quality of service (QoS) to be realized for particular processes that are dependent on memory transactions being performed within a certain amount of time. Based upon an indicated priority level, certain memory transactions can be performed out-of-turn from other memory transactions in an attempt to realize the QoS.

Further details and benefits of these embodiments and other embodiments are provided in relation to the figures. FIG. 1 illustrates an embodiment of a multi-processor unified memory management system 100 ("system 100"). System 100 can include: processor 110; processor 120; memory 130; memory 140; and inter-chip link 160.

Processor 110 and processor 120 may be various forms of processors on which customized modules can be implemented. For instance, processor 110 and processor 120 may be various types of FPGAs on which code can be implemented using programmable hardware. For example, one or both of FPGAs may be a multiple processor system on a chip (MPSoC). On each of processors 110 and 120, a separate instance of an MMM (150-1, 150-2) may be implemented. Each MMM may handle two primary tasks: 1) routing memory transactions appropriately; and 2) performing any conversion or translation needed to the memory transaction.

Native processing 112 of processor 110 may be implemented as firmware based on code or as executed software written by a person or obtained from some other source. MMM 150-1 may be implemented as a code module that is similarly implemented as firmware (or software) on processor 110. In other embodiments, MMMs may be implemented using hardware particularly designed for the purpose. Native processing 112 may generate either a memory-mapped or a stream-based memory transaction. Regardless of whether the memory transaction output by native processing 112 is memory-mapped or stream-based, the transaction can be routed to MMM 150-1. (Therefore, MMM 150-1 handles all forms of memory transactions for native processing 112.) MMM 150-1 may maintain a memory map that includes memory 130 of processor 110 and memory 140 of processor 120. A first address range may be mapped to processor 110 while a second memory address range may be mapped to processor 120. If a memory transaction received by MMM 150-1 corresponds to a memory address mapped to processor 110, the memory transaction may be performed directly by MMM 150-1 with memory 130. Memory transactions conducted by MMM 150-1 with memory 130 can be memory mapped transactions.

If a memory transaction received by MMM 150-1 from native processing 112 indicates a memory address mapped to processor 120, the memory transaction may be transmitted by MMM 150-1 via inter-chip link 160 to MMM 150-2. Native processing 112 of processor 110, may be able to generate a transaction using a memory mapped protocol (e.g., AXI4-memory mapped transactions) and/or a transaction using a stream protocol (e.g., AXI4-stream protocol data transfer transactions). In a memory mapped transaction, all transactions involve the use of a target memory address. In contrast, a stream transaction does not include a memory address associated with the transaction. A stream transaction (e.g., an AXI stream transaction) can allow for a unidirectional channel for data flow. A stream transaction may tend to provide better performance compared to a memory mapped transaction due to less overhead data being involved. Therefore, for communications between processors, AXI stream based transactions may be preferable.

MMM 150-1 may serve to convert a transaction to a stream transaction prior to sending via inter-chip link 160. The transaction may then be sent to MMM 150-2. MMM 150-2, which has the same memory map as MMM 150-1, may then perform the memory transaction using memory 140. MMM 150-2 may translate the received stream protocol transaction into a memory-mapped transaction to perform the memory transaction with memory 140. Encoded within the stream protocol transaction or sent via a sidelink transaction may be memory address information added by MMM 150-1. MMM 150-2 may decode these memory address information and use it to create the memory mapped transaction.

The memory address information may be sent by MMM 150-1 to MMM 150-2 using in-band signaling. In-band signally can involve a data header being sent before or after the data payload on the inter-chip link as part of the stream protocol transaction. Alternatively, side-band signaling may be used. An inter-chip link protocol, such as Interlaken, can support built-in low bandwidth sideband bus communications. Such arrangements allow for higher speed data transmissions in-band and lower speed transmissions via a sideband. Side-band signaling can include a memory address and control messages being sent on a low-bandwidth (relative to the high-bandwidth using to transmit the data payload), out-of-band inter-chip link. Therefore, using sideband signaling, a different frequency may be used for communication than the data.

As another alternative, efficient side-band signaling may be used. In efficient side-band signaling, the destination memory address is sent in-band; however, the identity (ID) of the target processor and routing metadata is sent through a low-bandwidth side-band link. Such an arrangement allows for the receiving MMM to not need to decode or analyze the incoming data payload to obtain a memory address. Therefore, the in-band data payload and address can be encrypted when transmitted between MMMs, while using the unencrypted metadata passed on the side-link to facilitate routing and handling of the data payload.

MMM 150-2 may function the same as MMM 150-1. Therefore, MMMs 150 may each handle memory read and write transactions to a local memory and remote memory that are part of a common flat memory map, along with handling any protocol translations necessary between a memory-mapped protocol and a stream protocol. A common piece of code may be used to implement MMMs 150. A difference between MMMs 150 may be which address range within a common flat memory map each MMM can access directly. From the point-of-view of native processing 112 and native processing 122, the entire memory map can be treated the same. Each MMM of MMMs 150 properly routes, translates, and responds to the memory transactions as needed.

Figure 2:
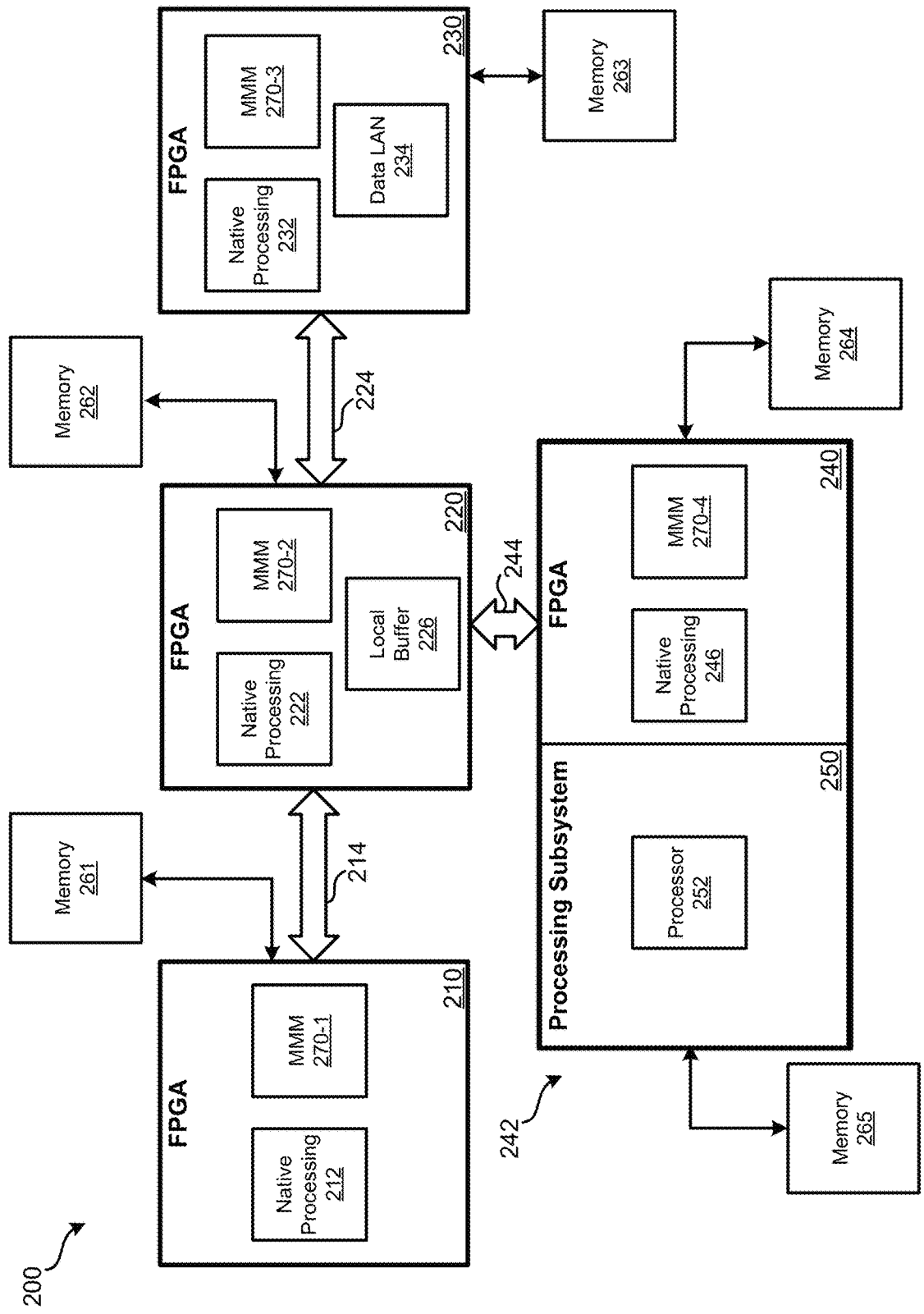
FIG. 2 illustrates another embodiment of a multi-processor unified memory management system.

FIG. 2 illustrates another embodiment of a multi-processor unified memory management system 200 ("system 200"). In system 200, a more complicated multi-chip architecture is present. It should be understood that the number and arrangement of processors is merely an example. System 200 can include: FPGA 210; FPGA 220; FPGA 230; and MPSoC 242. FPGAs 210, 220, and 230 can have various modules that are created as code and used to configure the FPGAs. FPGA 210 can include native processing 212 and MMM 270-1. MMM 270-1 may communicate directly with memory 261. Only FPGA 210 may be able to directly access memory 261; therefore, memory transactions that involve the portion of the system memory map corresponding to memory 261 may be required to be performed via MMM 270-1.

FPGA 220 can include native processing 222, MMM 270-2, and local buffer 226. Native processing 222 and MMM 270-2 may function as detailed in relation to the native processing and MMMs of system 100. However, MMM 270-2 may be configured to access an additional type of memory, such as local buffer 226. Local buffer 226 can represent high speed memory that is on-board FPGA 220. Local buffer 226 can be included as part of the system-wide common flat memory map and may be accessed via memory mapped transactions by MMM 270-2. Therefore, a memory transaction conducted by any of FPGAs 210, 220, 230, or MPSoC 242 may be routed to and handled by MMM 270-2.

FPGA 230 can include native processing 232, MMM 270-3, and data local area network (LAN) 234. Native processing 232 and MMM 270-3 may function as detailed in relation to the native processing and MMMs of system 100. However, MMM 270-3 may be additionally configured to communicate with data LAN 234. Data LAN 234 may serve as an interface for input and output of user data, such as via one or more user interfaces. Data exchanged with data LAN 234 may be via a stream protocol, therefore transactions conducted between MMM 270-3 and data LAN 234 may be converted to a stream protocol, if needed.

MPSoC 242 includes multiple on-board processors. For example, MPSoC 242 can include FPGA 240 and processing subsystem 250. FPGA 240 may include native processing 246 and MMM 270-4. Processing subsystem 250 may include one or more other types of processors, such as processor 252. Processor 252 could be a RISC-based processor (e.g., from ARM). MPSoC 242 may have multiple dedicated memories. MMM 270-4 may control access to memory 264 and memory 265. A memory mapped protocol may be used by MMM 270-4 for communication with memory 264 and memory 265. Further MMM 270-4 may allow for processor 252 to perform a memory mapped transaction with FPGA 240 or any of FPGAs 210, 220, and 230. MMM 270-4, similar to the other instances of MMMs 270 may translate a memory mapped protocol transaction into a stream protocol transaction. When a memory mapped protocol transaction, the memory address information included as part of the memory mapped protocol transaction may be embedded as part of the stream protocol transaction such that the memory address information can be extracted by the receiving MMM.

Multiple high-speed inter-chip links are present between FPGAs 210, 220, 230, and MPSoC 242. FPGA 210 may communicate with FPGA 220 via inter-chip link 214. FPGA 220 may communicate with FPGA 230 via inter-chip link 224. FPGA 220 may communicate with FPGA 240 via inter-chip link 244. It should be understood that this hub-and-spoke arrangement around FPGA 220 is merely an example. Additional or alternate inter-chip links may be present. For example, FPGA 210 may have a second inter-chip link to, for example, FPGA 230.

Each MMM of MMMs 270 may only have data stored indicating to which processor a memory transaction should be forwarded. For example, the flat memory map maintained by MMM 270-1 may indicate a first range of memory addresses that correspond to memory 261. All other memory addresses may correspond to FPGA 220 and MMM 270-2. However, upon receipt of a memory transaction from MMM 270-1, MMM 270-2 may need to perform further forwarding, such as to FPGA 230 or FPGA 240. Further, each MMM of MMM 270 can handle stream-based memory transactions (or another form of non-memory mapped memory transactions) and memory mapped memory transactions in immediate succession.

As an example of such an arrangement, native processing 212 may conduct a memory transaction with a particular memory address. The memory transaction may be sent to MMM 270-1 by native processing 212. MMM 270-1 may determine that the memory transaction corresponds to a memory address in the flat memory map that corresponds to FPGA 220. The memory transaction may be sent via a stream transaction to FPGA 220 and received by MMM 270-2. MMM 270-2 may analyze the stream transaction to extract memory address information. MMM 270-2 may access the flat memory map and determine that the memory address corresponds to FPGA 230 and MMM 270-3. A second memory transaction may be sent via a stream transaction to FPGA 230 by FPGA 220 and received by MMM 270-3. MMM 270-3 may analyze the stream transaction to extract memory address information and may then conduct the memory transaction locally with memory 263. Therefore, from the point-of-view of MMM 270-1, the flat memory map indicates that the memory transaction should be sent to FPGA 220. The flat memory map of MMM 270-2, which corresponds to the same addresses, indicates that the memory transaction is to be sent via inter-chip link 224 to FPGA 230. The memory map of MMM 270-3 indicates the memory transaction is to be handled directly with memory 263.

Therefore, an advantage to at least some of the arrangements detailed herein is that the MMM transmitting the memory transaction has the memory address destination, but does not need all of the details of the route for the transaction to the memory address. Rather, the MMM transmitting the memory transaction determines the next MMM to which the memory transaction should be transmitted. This next MMM determines the next hop toward the memory address destination (if a next hop is needed). Such an arrangement can further allow for a stream transaction to be transmitted without the destination memory address being known. Rather, the stream memory transaction can be routed based on a destination processor identifier. A separate memory address space may be maintained that is mapped to only the processor identifier and the local MMM determines the specific memory addresses.

Figure 3:
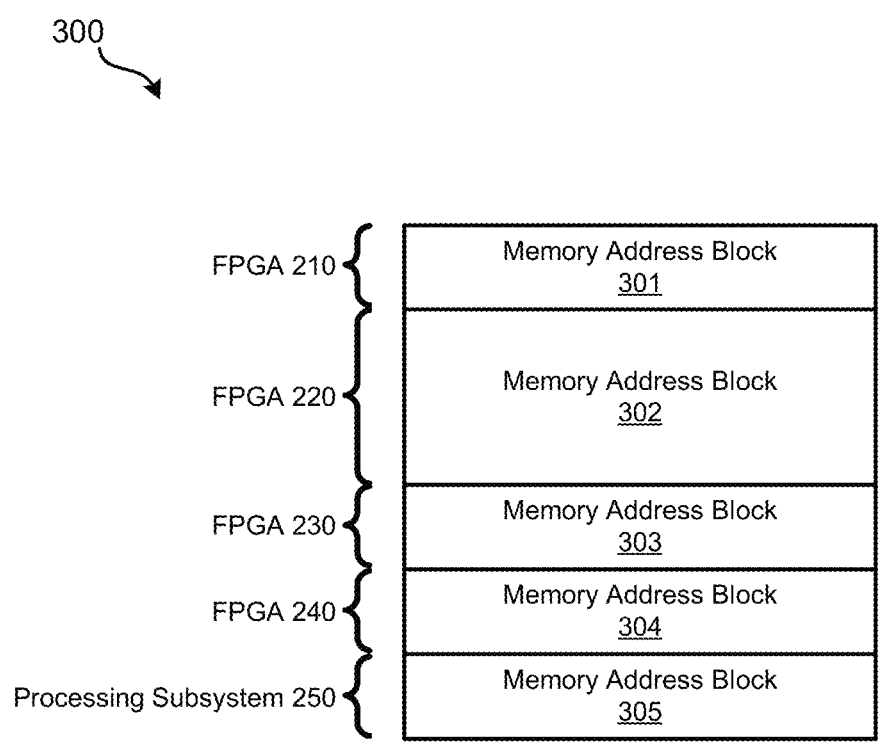
FIG. 3 illustrates an embodiment of a flat memory map created using a unified memory management system.

FIG. 3 illustrates an embodiment of a flat memory map 300 created using a unified memory management system. Flat memory map 300 may be common across all processors of a unified memory management system, such as system 200 of FIG. 2. Memory map 300 indicates five memory address blocks: memory block 301; memory address block 302; memory address block 303; memory address block 304; and memory address block 305. The version of memory map 300 stored by each MMM can include the same data stored at the same memory addresses.

The example of FIG. 3 corresponds to system 200. In this example, memory address block 301 corresponds to a memory (e.g., DDR RAM, local buffer) in direct communication with FPGA 210, memory address block 302 corresponds to a memory in direct communication with FPGA 220; memory address block 303 corresponds to a memory in direct communication with FPGA 230; memory address block 304 corresponds to a memory in communication with FPGA 240; and memory address block 305 corresponds to a memory in direct communication with processing subsystem 250.

While each memory map may correspond to the same data, each memory map may differ in how various memory address blocks are mapped for access. From the perspective of MMM 270-1, memory transactions involving memory address within memory address block 301 may be directly handled; memory transactions involving memory addresses within memory address blocks 302-305 may be forwarded to FPGA 220 via inter-chip link 214. In contrast, from the perspective of MMM 270-2, memory transactions involving memory address within memory address block 301 may be forwarded to FPGA 210 via inter-chip link 214; memory transactions involving memory addresses within memory address block 302 may be directly handled, memory transaction involving memory addresses within memory address block 303 may be forwarded to FPGA 230 via inter-chip link 224; and memory transaction involving memory addresses within memory address blocks 304 and 305 may be forwarded to FPGA 240 via inter-chip link 244. Therefore, while each processor may have access to the entire memory map, the routing of memory transactions within a system can be controlled by MMMs based on stored flat memory maps.

Figure 4:
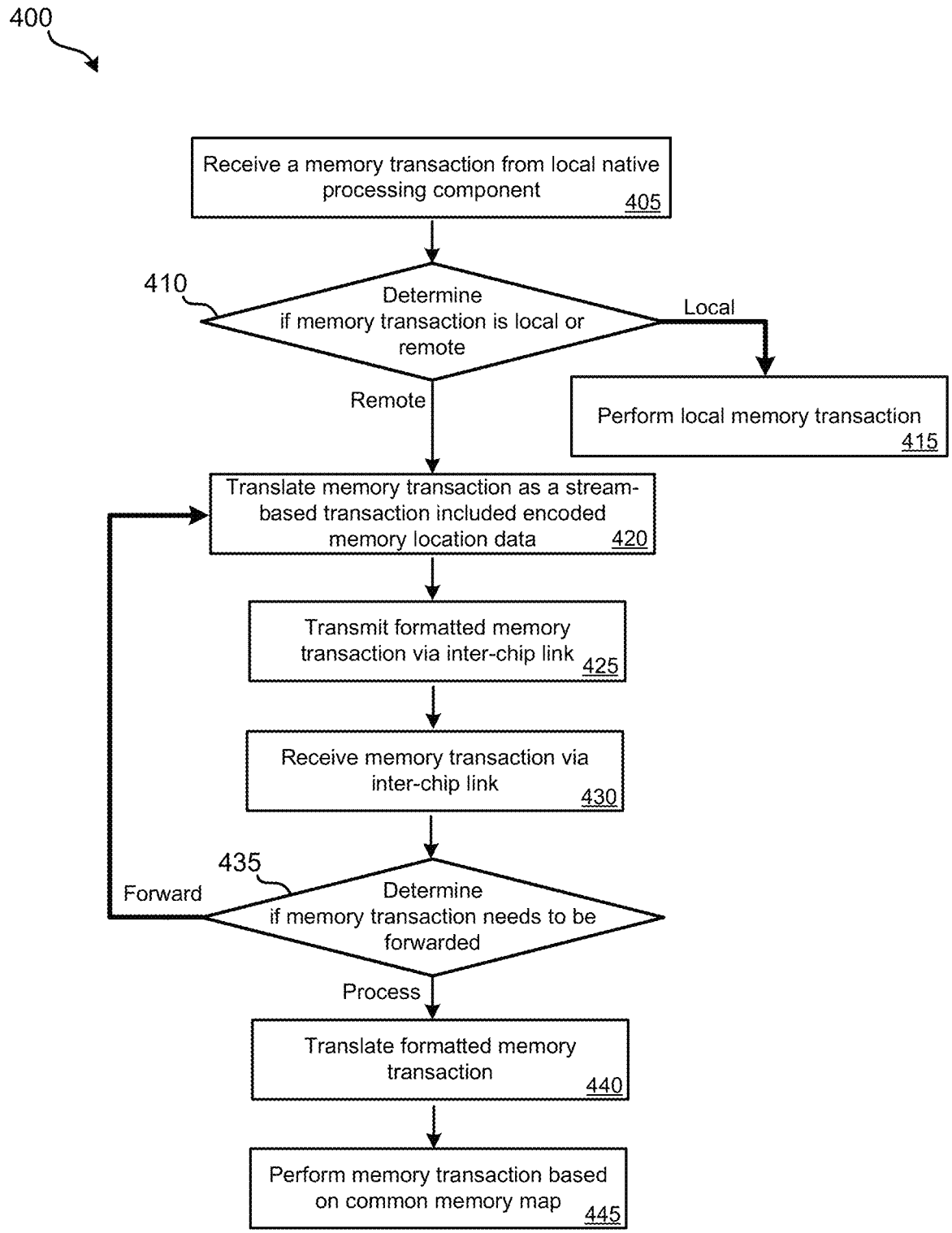
FIG. 4 illustrates an embodiment of a method for using a unified memory management system.

Various methods may be performed using the systems and memory mapping arrangements detailed in relation to FIGS. 1-3. FIG. 4 illustrates an embodiment of a method 400 for using a unified memory management system. Method 400 can involve the use of systems arranged similar to system 100 and system 200.

At block 405, a memory transaction may be received from a local native processing component. Block 405 may be performed by an MMM being executed by the processing system that is performing native processing. The memory transaction may be a stream-based memory transaction (or another form of non-memory mapped memory transaction) or a memory mapped memory transaction. The MMM can be configured to handle both types of memory transactions in immediate succession. Therefore, the native processing process may transmit a memory request to the MMM. The native processing process may not have visibility as to whether the memory transaction involves local memory or data stored in memory of another processor.

At block 410, the MMM may determine if the memory transaction involves local or remote memory. The MMM may make the determination by a memory address of the request. Since a single memory map is used across the entire, multi-processor system, one or more ranges of memory addresses are mapped to the local memory.

Block 415 is performed if block 410 was determined to involve a local memory transaction. At block 415, the MMM may directly access the local memory and perform the memory transaction, such as writing to the memory address or reading from the memory address.

Block 420 is performed if block 410 was determined to involve a remote memory transaction. That is, the memory transaction involves accessing memory that is only in direction communication with another processor of the system. At block 420, the MMM may translate the memory transaction into a stream-based memory transaction that includes memory location data encoded as part of the transaction output by the MMM. If the processor is in communication with multiple processors, the appropriate processor to which the memory transaction is to be sent may be selected. The appropriate processor may be selected based on the memory address.

At block 425, the memory transaction output by the MMM may be forwarded via an inter-chip link 425 to another processor, which may have been selected as part of block 420. At block 430, the memory transaction is received by the other processor via the inter-chip link. The memory transaction may be analyzed by an MMM of the processor that received the memory transaction. The MMM may then determine at block 435, based on the encoded memory location, whether the memory address is directly accessible by the processor that received the memory transaction or if the memory transaction needs to be forwarded again. If forwarded again, the transaction may be translated and forwarded at blocks 420 through 435 until the memory transaction arrives at the correct processor. In most implementations, no more than four or five processors may be chained together, and thus forwarding of a memory transaction may occur at most only a few times. However, in some implementations many more processors may be chained together and forwarding of the memory transaction may need to be performed many times.

If at block 435 it is determined that the memory transaction does not need to be forwarded since the memory address corresponds to an address of the memory map for memory that is directly accessed by the processor that received the request, method 400 proceeds to block 440. At block 440, translation, if needed, is performed on the received memory transaction. At block 445, the memory transaction is performed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A multi-processor unified memory management system, comprising:
a first programmable processor system that communicates via an inter-chip link with a second programmable processor system, wherein the first programmable processor system comprises:
a first inter-chip memory management module configured to:
analyze memory access transactions;
translate outbound memory-mapped transactions into non-memory mapped transactions comprising coded memory address data; and
the second programmable processor system that communicates via the inter-chip link with the first programmable processor system, wherein the second programmable processor system comprises:
a second inter-chip memory management module configured to:
analyze memory access transactions; and
translate inbound non-memory mapped transactions into memory-mapped transactions based on coded memory address data.

2. The multi-processor unified memory management system of claim 1, wherein the first inter-chip memory management module is further configured to:
analyze a memory access transaction;
determine that the memory access transaction involves a memory address accessible via the second programmable processor system; and
in response to determining that the memory access transaction involves the memory address accessible via the second programmable processor system, output a non-memory mapped transaction via the inter-chip link to the second programmable processor system, wherein the non-memory mapped transaction comprises coded memory address data.

3. The multi-processor unified memory management system of claim 2, wherein the second inter-chip memory management module is further configured to receive the non-memory mapped transaction from the first inter-chip memory management module.

4. The multi-processor unified memory management system of claim 3, wherein the second inter-chip memory management module is further configured to store data from the received non-memory mapped transaction into memory at a memory location based on the coded memory address data included in the non-memory mapped transaction.

5. The multi-processor unified memory management system of claim 1, further comprising:
- a first memory directly accessible by only the first programmable processor system; and
- a second memory directly accessible by only the second programmable processor system.

6. The multi-processor unified memory management system of claim 1, wherein the first inter-chip memory management module and the second inter-chip memory management module use a common flat memory map.

7. The multi-processor unified memory management system of claim 1, wherein the first programmable processor system comprises a first field programmable gate array (FPGA).

8. The multi-processor unified memory management system of claim 7, wherein the second programmable processor system comprises a second FPGA.

9. The multi-processor unified memory management system of claim 7, wherein the second programmable processor system comprises a reduced instruction set computer (RISC) processor.

10. The multi-processor unified memory management system of claim 1, wherein the first inter-chip memory management module and the second inter-chip memory management module are each configured to process both memory mapped transactions and non-memory mapped transactions in any order in which the transactions are received.

11. A method for using a unified memory management system, the method comprising:
- outputting, by a native processing module of a first processor, a memory transaction;
- determining, by a first inter-chip memory management module executed by the first processor, that the memory transaction corresponds to a portion of a flat memory map that is managed by another processor;
- translating, by the first inter-chip memory management module, the memory transaction into a non-memory mapped memory transaction; and
- transmitting, by the first inter-chip memory management module, the translated memory transaction via an inter-chip link to a second processor.

12. The method for using the unified memory management system of claim 11, further comprising:
receiving, by a second inter-chip memory management module, the transmitted translated memory transaction via the inter-chip link.

13. The method for using the unified memory management system of claim 12, further comprising:
determining, by the second inter-chip memory management module, that the transmitted translated memory transaction is not to be forwarded.

14. The method for using the unified memory management system of claim 13, further comprising translating, by the second inter-chip memory management module of the second processor, the translated memory transaction into a memory-mapped memory transaction.

15. The method for using the unified memory management system of claim 14, further comprising performing, by the second inter-chip memory management module, the memory-mapped memory transaction.

16. The method for using the unified memory management system of claim 15, wherein determining that the transmitted translated memory transaction is not to be forwarded is based on the portion of the flat memory map being managed by the second inter-chip memory management module of the second processor.

17. The method for using the unified memory management system of claim 11, wherein the first processor is a first field-programmable gate array (FPGA) and the second processor is a second FPGA.

18. The method for using the unified memory management system of claim 15, wherein:
performing the memory-mapped memory transaction comprises storing data from the memory transaction into memory at a memory location based on coded memory address data included in the non-memory mapped transaction.

19. The method for using the unified memory management system of claim 18, wherein:
a memory address corresponding to the flat memory map is transmitted via a side-band communication as part of transmitting the translated memory transaction via the inter-chip link.

20. The method for using the unified memory management system of claim 11, wherein transmitting, by the first inter-chip memory management module, the translated memory transaction via the inter-chip link to a second inter-chip memory management module of the second processor comprises:
forwarding, by a third inter-chip memory management module of a third processor, the translated memory transaction via the inter-chip link to the second inter-chip memory management module of the second processor.

* * * * *